Nov. 22, 1960  R. W. JENSEN  2,961,163
PNEUMATIC TEMPERATURE CONTROL MECHANISM
Filed Aug. 13, 1952  3 Sheets-Sheet 1
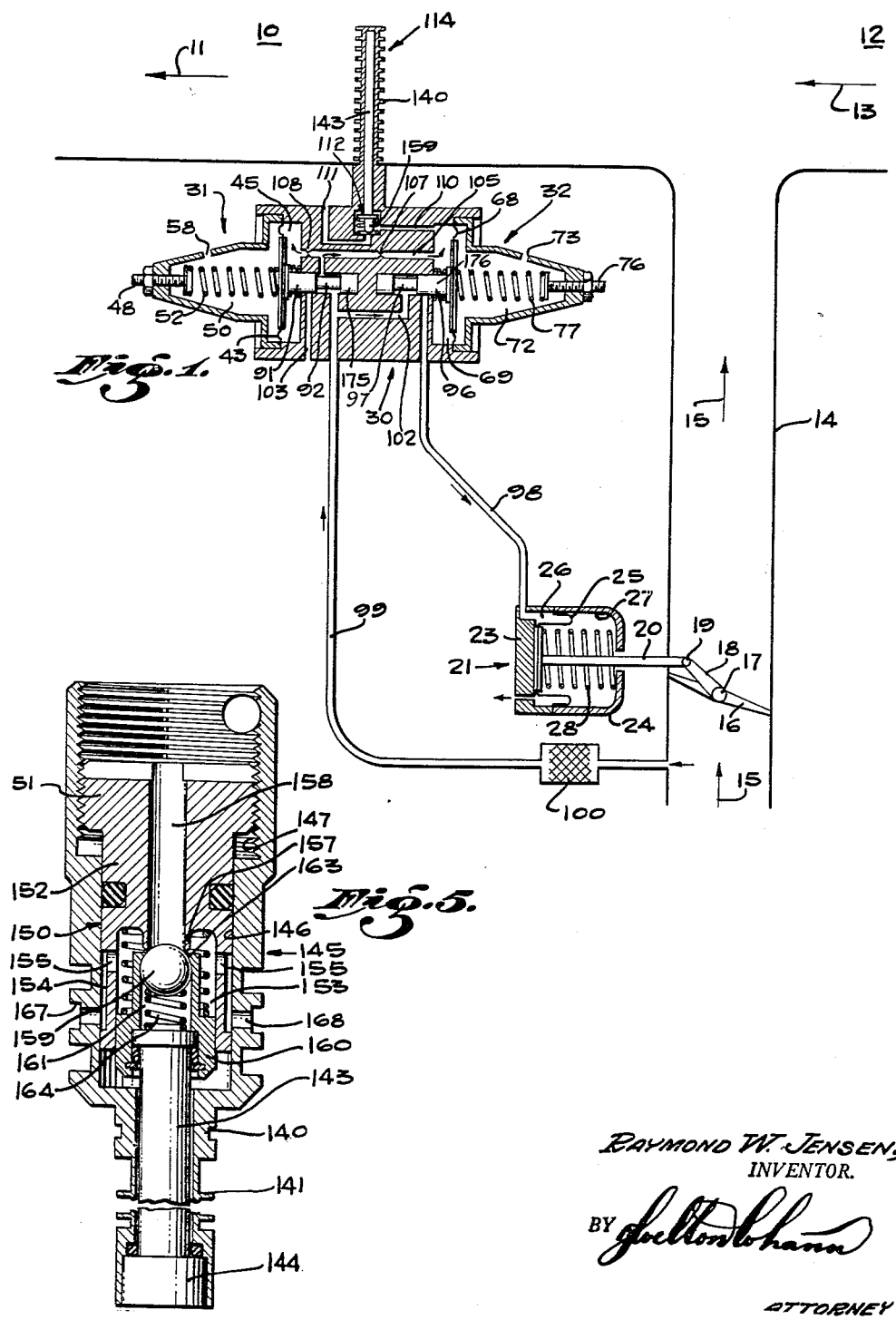
RAYMOND W. JENSEN,
INVENTOR.
BY
ATTORNEY

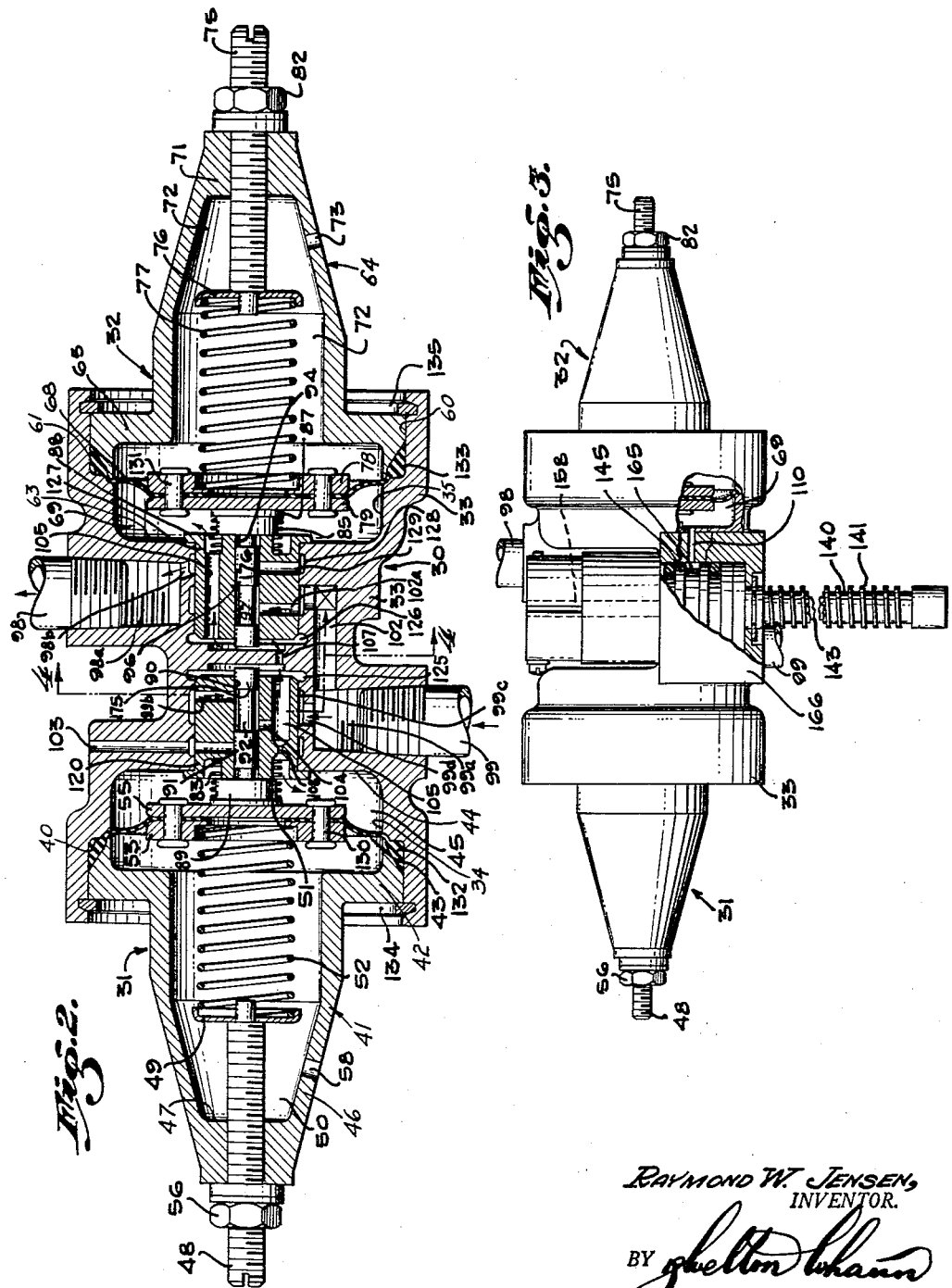

Nov. 22, 1960  R. W. JENSEN  2,961,163
PNEUMATIC TEMPERATURE CONTROL MECHANISM
Filed Aug. 13, 1952  3 Sheets-Sheet 3
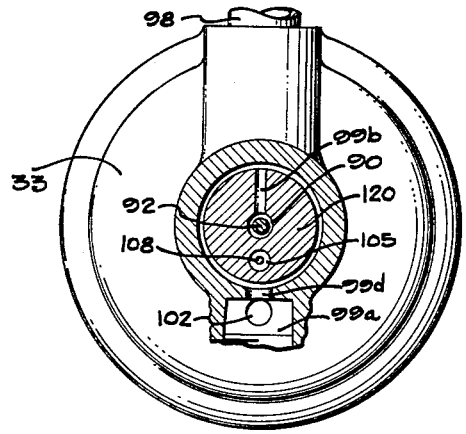
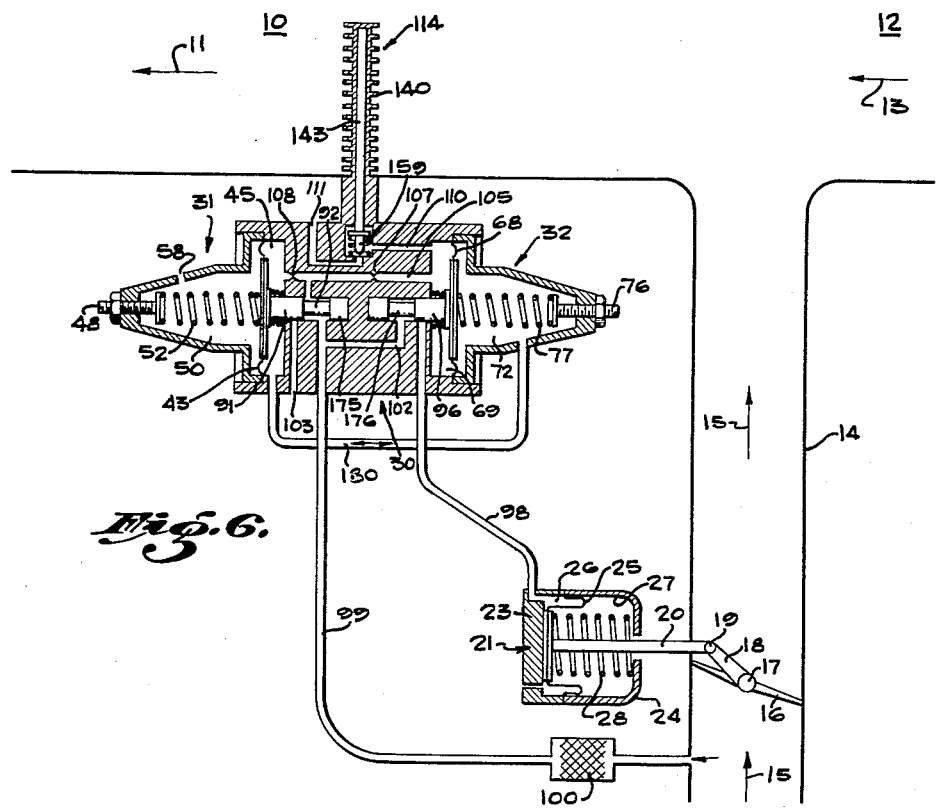
Raymond W. Jensen,
INVENTOR.
BY
ATTORNEY United States Patent Office 2,961,163
Patented Nov. 22, 1960

2,961,163

PNEUMATIC TEMPERATURE CONTROL MECHANISM

Raymond W. Jensen, Encino, Calif., assignor to The Garrett Corporation, Los Angeles, Calif., a corporation of California Filed Aug. 13, 1952, Ser. No. 304,130

6 Claims. (Cl. 236—13)

This invention relates generally to fluid control means and relates more particularly to fluid temperature control means.

While the invention may be utilized in various types of installations, it is shown and described herein as utilized to regulate the temperature of air which may be used for various purposes.

It is an object of the present invention to provide means for controlling the temperature of such air by mixing hot and cold air to provide an air mixture of the desired temperature.

Another object of the invention is to provide means of this character which controls the mixing of such hot and cold air in accordance with the temperature of the air mixture.

Another object of the invention is to provide means of this character which is reliable in its functioning.

A further object of the invention is to provide means of this character which will accurately control the temperature of the air mixture.

A still further object of the invention is to provide means of this character that will efficiently control the mixing of air to provide a mixture of the desired temperature.

Another object of the invention is to provide means of this character that is stable in its operation.

Still another object of the invention is to provide means of this character that is relatively simple and compact in construction and relatively light in weight.

A further object of the invention is to provide means of this character that is relatively inexpensive to manufacture.

Other objects and advantages of the invention will appear in the following part of the specification.

Referring to the drawings, which are for illustrative purposes only:

Fig. 1 is a diagrammatic view of the apparatus embodying the present invention.

Fig. 2 is an enlarged sectional view of the regulator and amplifier thereof;

Fig. 3 is a view, partly in section, showing the thermostatic unit and its connection with the regulator-amplifier assembly;

Fig. 4 is a sectional view taken on line 4—4 of Fig. 2;

Fig. 5 is a sectional view through the thermostatic unit showing certain details of construction; and Fig. 6 is a diagrammatic view showing an alternative arrangement.

Referring to Fig. 1, there is shown an air conduit 10 which may be connected with other equipment, enclosure or the like, not shown, the direction of air flow being indicated by the arrow 11. Conduit 10 receives cool air from a conduit 12, which cool air flows in the direction indicated by the arrow 13 and is derived from any suitable source. In order to condition the air in conduit 10, hot air at a relatively high pressure, derived from any suitable source, is introduced into the conduit 10 by means of a conduit 14, the hot compressed air flowing in the direction indicated by the arrows 15. Air flow through the conduit 14 is controlled by a valve 16, said valve being shown as a butterfly valve although any other suitable type of valve may be used. Valve 16 has a valve shaft 17 to which one end of an actuating arm 18 is connected, the opposite end of said actuating arm being operably connected at 19 to an actuating rod 20 of a valve actuator, indicated generally at 21.

The actuator 21 comprises a base member 23 and a shell 24 between which is marginally clamped a diaphragm 25 to which the inner end of the rod 20 is secured. The diaphragm 25 divides the interior of the actuator into a pressure chamber 26 and a spring chamber 27, there being a spring 28 in said chamber 27 urging a central portion of the diaphragm 25 to the left, as shown in Fig. 1, to yieldingly close the valve 16.

Pressure in the chamber 26 moves the diaphragm 25 rightwardly, as shown in Fig. 1, against the force of spring 28 to effect opening movement of the valve 16.

Control of the pressure in chamber 26 is effected by the regulator-amplifier mechanism indicated generally at 30 (Figs. 1 to 4 inclusive), the regulator portion of the assembly 30 being indicated generally at 31 and the amplifier portion thereof being indicated generally at 32. The control assembly 30 is provided with a body member 33 having recesses, indicated generally at 34 and 35, at each of the respective ends.

The recess 34 is provided with a shoulder 40 and there is a hollow retainer, indicated generally at 41 which has an annular, generally cup-shaped part 42 which clamps the marginal edge portion of a diaphragm 43 against said shoulder 40. The shoulder 40 is spaced from the bottom 44 of the recess 34 and the diaphragm 43, together with the bottom portion of the recess 34, defines a regulated pressure chamber 45. The retainer 41 has an outwardly extending, inwardly tapered end portion 46 which terminates in an end wall 47 provided with a threaded bore in axial relation to said retainer. Threaded into the bore is the adjusting screw 48 provided with a spring retainer 49 at the inner end thereof which is located within the hollow interior 50 of the retainer 41. A spring 52 reacts between the spring retainer 49 and a plate 53 disposed on the adjacent side of the diaphragm 43. There is a corresponding plate 55 on the opposite side of the diaphragm, said plates 53 and 55 providing reinforcing means for the central area of the diaphragm 43. A nut 56 is provided on the outer end of the adjusting screw 48 to provide means for locking said screw in adjusted positions. Chamber 50 is vented to any suitable, low pressure region which is shown as ambient atmosphere by the bleed 58 to eliminate undesirable pressures within said chamber 50. The recess 35 of the amplifier has an enlarged end portion 60 thereby forming a shoulder 61 spaced from the bottom 63 of said recess 35. A retainer, indicated generally at 64, is of substantially the same construction as the retainer 41 and includes a cup-like portion 65. The outer free edge of said cup-like portion 65 is received in the enlarged portion 60 of the recess 35 to thereby marginally clamp a diaphragm 68 against the shoulder 61. The diaphragm 68 and the walls of the recess 35 adjacent the bottom define a pressure chamber 69. The retainer 64 extends from the bottom of the cup-shaped part 65 and is generally cone-shaped, there being an end wall 71 which is provided with a threaded bore arranged axially with the retainer 64. The retainer, together with the diaphragm 68, defines a chamber 72 which is also vented to any suitable region of low pressure such as the atmosphere by means of a bleed 73.

An adjustment screw 75 is threadably received in the bore in the wall 71 and is provided with a spring retainer 76 adjacent the inner end. A spring 77 reacts between the spring retainer 76 and a plate 78 on the adjacent side of the diaphragm 68. There is another plate 79 on the opposite side of the diaphragm 68 and said plates 78 and 79 reinforce the central area of the diaphragm 68. The adjusting screw 75 is locked in adjusted positions by a nut 82 after adjusting the force of spring 77 by said screw 75.

A bore 90 extends axially from the bottom of the recess 34 and is adapted to slidably receive a movable valve member 91 which has one end connected to the diaphragm 43 and is provided with a relieved annular portion 92 intermediate the ends thereof.

Valve member 91 has an enlarged head 89 (Figs. 1 and 2) at the outer end thereof which is held in abutment with the disc or plate 55 by a light spring 83 which reacts between the bottom of the recess 34 and a flange 51 at the outer end of said enlarged head 89. Thus the valve member has a one-way connection with the plate 55 and, hence, diaphragm 43.

There is a bore 94 which extends from the bottom of the recess 35 toward the bore 90 and in axial alignment therewith, the bottom of said bores being spaced apart. A movable valve member 96 is slidably received in said bore 94 and is provided with a relieved portion 97 intermediate the ends thereof, the valve member 96 having an enlarged head 88 adjacent the outer end thereof which is held in abutment with the disc or plate 79 by means of a light spring 85 which reacts between the bottom of the recess 35 and an outwardly extending flange 87 at the outer end of said enlarged head 88. The valve member 96 thus has a one-way connection with the plate 79 and will follow movements of the diaphragm 68.

Chamber 26 of the actuating device 21 is connected, by means of a conduit 98, with the bore 94 adjacent the open end of said bore. The conduit 98 has a threaded end which is received in a tapered bore 98a in the body 33 of the regulator-amplifier assembly. Bore 90 is connected, by means of a conduit 99, with the passage 14 upstream of the valve 16, there being an air filter 100 interposed in said conduit 99. One end of conduit 99 is threaded and is received in a tapered bore 99a in the body 33. There is a connection 102 between the bore 94 and the conduit 99. Bore 90 has a connection 103 with atmosphere and another connection 104 which connects with a passage 105 and 105a extending longitudinally in the body 33 and forming a connection between the chambers 45 and 69. Between the junction of the passage 104 with passage 105, and the chamber 69, there is a restricted orifice 107. There is also a restricted orifice 108 between the junction of said passage 104 and passage 105 and the chamber 45. Chamber 69 has a connection with any suitable low pressure region such as atmosphere, comprising passages 110 and 111, see Fig. 1 controlled by a valve, indicated generally at 112, interposed between the adjacent ends of the said passages 110 and 111. Valve 112 is controlled by temperature responsive means, indicated generally at 114, said valve and thermostatic means being described more particularly hereinafter.

Considering now certain structural features of the apparatus, and referring particularly to Figs. 2 and 4, the bore 90 is located in a plug 120 disposed in a recess provided therefor in the body 33 and having suitable passages forming parts of the various connections required. There is a transverse bore 99b which leads to an annular recess 99c and the latter is connected with bore 99a by means of a passage 99d. When the valve member 91 is in the position shown in Fig. 2, bore 99b connects with the bore 90 at the relieved portion 92 of said valve member. The passage 104 is formed in the plug 120 and a portion of the passage 105 is formed in said plug as well as the restricted orifice 108. At the inner end of the plug 120, the body 33 is provided with an enlarged recess 125 connecting with that part of passage 105 located in the plug 120. The restricted orifice 107 is located in the partition separating the valves 91 and 96 and connects the recess 125 with a recess 126 adjacent the inner end of a plug 127 in which bore 94 is formed. Another portion of the passage 105 is formed in the plug 127 and connects the recess 126 with the chamber 69. A part of passage 102 is within the plug 127 and is indicated at 102a. Bore 98a has a connection 98b with an annular recess 128 from which a cross-bore 129 extends to the bore 94 thus completing the connection of conduit 98 with said bore 94.

It is to be noted that valve members 91 and 96 are limited in their inward movement by the seating of their respective enlarged portions 89 and 88 against the outer ends of the plugs 120 and 127 and that, when in their inward limits of movement, the inner ends of said valve members are spaced slightly from the partition wall separating chambers 125 and 126.

With regard to the plates 53 and 55, said plates are secured together by means of rivets 130 and plates 78 and 79 are secured together by means of rivets 131. The diaphragms 43 and 68 are provided with peripheral beads 132 and 133 respectively engaged by the adjacent ends of the retainers 42 and 65. The retainers are releasably secured in position by snap rings 134 and 135 which are received in suitable annular grooves provided therefor in the recesses 34 and 35. The temperature responsive mechanism which controls the connection between the chamber 69 and atmosphere includes a tubular member 140 having external fins 141. These fins are shown as in the form of a spiral although they could be formed independently of each other. The tubular member 140 has a coefficient of expansion. Within the member 140 is a rod 143 which abuts against a plug 144 secured in the outer end of the member 140. The other end 145 of the member 140 is enlarged and has a chamber 146 terminating in an enlarged portion 147.

The portion 147 is internally threaded and receives a plug 150 which has an externally threaded end 151 and a reduced diameter portion 152 received in the chamber 146. The portion 152 of the plug has its inner end recessed at 153 and has an annular reduced portion 154, there being openings or passages 155 between the recess 153 and reduced portion 154. Within the chamber is an axially projecting tubular member 157 and there is a passage 158 from the inner or free end of said portion 157 through said plug 150. A ball valve 159 cooperates with the free end of the projecting portion 157, which forms a valve seat and said ball valve member controls the flow of fluid from the chamber 153 through the passage 158. Within the chamber 153 is a slidable member 160 which is secured to the rod or core 143 and which has a hollow interior 161 in which the ball 159 is received. The end of the member 160 opposite the core 143 is open and has a flange 163 which extends inwardly of the recess 161 to hold the ball 159 from escaping from said recess. A spring 164 urges the ball outwardly of the member 160 so as to insure proper seating when the core 143 is in the position shown in Fig. 5.

The enlarged end 145 is removably secured in a chamber 165 provided therefor in a boss 166 which forms part of the body 33. The passage 110 communicates with the chamber 165 at a point where the enlarged portion 145 is grooved, as at 167, and there are openings 168 between the groove and the chamber 153 so that air may flow from the pressure chamber 69 through the passage 110, into the chamber 154 by way of the passages 168 and thence through passage 155 into the chamber 153. When the ball valve 159 is unseated, air will then flow through the passage 158 and thence to atmosphere.

High pressure air is transmitted from the conduit 14 anterior of the valve 16 therein, through conduit 99, through the space provided by the annular reduced portion 92 of valve 91 and thence through the passage 104 to the passage 105, the air flowing through the restricted damping orifice 108 and into the pressure chamber 45. The diaphragm 43 is subjected on one side to the pressure in said control chamber 45 and on the opposite side to the region of lower pressure, said diaphragm 43 responding to variations in differential between these pressures and will control the position of the valve 91. This valve has an inner end portion 175 which controls the flow of fluid under relatively high pressure to the chamber 45. It is to be noted also that there is fluid flow through the passage 105 to the chamber 69 through the control orifice 107. The valve 91 controls the pressure delivered to the pressure chambers 45 and 69 while the valve 96 has a part 176 which controls the pressure to the chamber 26 of the actuating device 21. Inasmuch as the regulator controls the pressure to the amplifier chamber 69, the positioning of valve 96 is under the control of said regulator.

The pressure in chamber 69 is modified by the temperature control device which controls the escape of air from the chamber 69 to a lower pressure region. This temperature responsive device is of known character and functions in the well-known manner. As a matter of fact, any suitable temperature responsive device may serve the present purpose.

It is to be noted that the temperature responsive device is so located as to be subjected to the air in the conduit 10 downstream of the location where the hot air and cold air from conduits 14 and 12 respectively are mixed. Thus the temperature responsive device will respond to variations in the temperature of the mixed air.

Assuming that the temperature of the air in conduit 10 increases above the desired point, the elements 140 and 143 of the thermostat will expand. In view of the fact that element 140 has a greater coefficient of expansion than the core 143, the valve 159 will be raised from its seat to permit escape of air from chamber 69. This will effect a reduction in the pressure in said chamber and will result in the valve 96 moving in the closing direction to effect a reduction in the pressure in chamber 26 of the actuator 21. Spring 28 will cause the valve 16 to be moved in the closing direction so as to reduce the amount of hot compressed air delivered to conduit 10. Thus it will be apparent that a reduction in the temperature of the mixed air in conduit 10 will result. Should the temperature of the air in conduit 10 drop below a desired point, the thermostatic valve 159 will be moved in the closing direction to restrict the bleed of air from the chamber 69 to atmosphere.

This will result in a build up of pressure in chamber 69 and an increase in the pressure in chamber 26 of actuator 21. This increase in pressure in chamber 26 will effect an opening movement of the valve 16 and provide more hot air to the mixture so that the temperature of said mixture is thus increased.

In some installations, it has been found desirable to provide a connection 180 (Fig. 6) between chamber 45 of the regulator and chamber 72 of the amplifier, the opening 73 of the amplifier being then dispensed with. This arrangement tends to give a more stable operation when operated in conjunction with other controls in a system where upstream pulsations may be encountered in the control pressure line or duct.

There is also means provided to protect the diaphragm 43 of the regulator 31 against excessive pressures. This safety feature comprises the atmospheric dump or passage 103 which may be opened by movement to the left, as shown in the drawings, of valve 91 so that this passage is connected with the line 99 by means of the reduced diameter portion of said valve 91.

I claim:

1. Temperature control apparatus for controlling the temperature of air in a mixing chamber wherein said chamber has a supply of relatively hot air at relatively high pressure and a supply of relatively cool air, comprising: a valve controlling the supply of hot air to said chamber; a pressure responsive actuator controlling said valve, said actuator having a diaphragm subjected on one side to ambient pressure; means defining, with said diaphragm, a control pressure chamber, the other side of said diaphragm being subjected to said control chamber pressure, the diaphragm responding to variations in the differential of pressure on the opposite sides thereof; pressure regulating means including a pressure responsive diaphragm responsive to variations in the differential of pressure on opposite sides thereof, one side of said diaphragm being subjected to ambient pressure; means defining a regulator pressure chamber, the other side of said diaphragm being subjected to the pressure in said regulator pressure chamber; a conduit connecting the regulator pressure chamber with the high pressure supply; a valve, including a movable valve member, operably connected with the regulator diaphragm and adapted to control said conduit; a duct connecting said conduit with the control pressure chamber; a valve, including a movable valve member, for controlling said duct; an amplifier diaphragm operably connected with the last mentioned valve member and responsive to variations in the differential of pressure on opposite sides thereof, one side of said amplifier diaphragm being subjected to ambient pressure; means defining an amplifier pressure chamber, the opposite side of said diaphragm being subjected to pressure in said amplifier pressure chamber; means defining a passage connecting the regulator chamber and the amplifier chamber, there being a restricted orifice in said passage between the source of pressure and said amplifier chamber; means defining a second orifice disposed between the source of pressure and the regulator chamber, said second orifice also being between the regulator chamber and the amplifier chamber; an outflow passage between the amplifier chamber and ambient atmosphere; a valve controlling said outflow passage; temperature responsive means subjected to the temperature in said mixing chamber and controlling the last mentioned valve; and means defining a pressure relief passage between said conduit and ambient atmosphere upstream of said restricted orifices, said pressure relief passage being controlled by the regulator valve member.

2. Temperature control apparatus for controlling the temperature of air in a mixing chamber wherein said chamber has a supply of relatively hot air at relatively high pressure and a supply of relatively cool air, comprising: a valve controlling the supply of hot air to said chamber; a pressure responsive actuator controlling said valve, said actuator having a diaphragm subjected on one side to ambient pressure; means defining a control pressure chamber at the other side of said diaphragm so that said side of said diaphragm is subjected to said control pressure chamber, the diaphragm responding to variations in the differential of pressure on the opposite sides thereof; pressure regulating means including a pressure responsive diaphragm responsive to variations in the differential of pressure on opposite sides thereof, one side of said diaphragm being subjected to ambient pressure; means defining a regulator pressure chamber, the other side of said diaphragm being subjected to the pressure in said regulator pressure chamber; amplifier means including an amplifier diaphragm responsive to variations in the differential of pressure on opposite sides thereof, one side of said amplifier diaphragm being subjected to ambient pressure; means defining an amplifier pressure chamber, the opposite side of said diaphragm being subjected to pressure in said amplifier pressure chamber; means defining a passage connecting the regulator chamber and the amplifier chamber, there being a pair of restricted orifices in said passage, said orifices being spaced apart; a conduit connecting the high pressure supply with said passage between said orifices; a regulator valve, including a movable valve member operably connected with the regulator diaphragm, adapted to control said conduit; a duct connecting said conduit with the actuator pressure chamber; an amplifier valve, including a movable valve member controlling said duct; an outflow passage between the amplifier chamber and ambient atmosphere; a valve controlling said outflow passage; and temperature responsive means subjected to the temperature in said mixing chamber and controlling the last mentioned valve.

3. Temperature control apparatus for controlling the temperature of air in a mixing chamber wherein there is a source of relatively hot air for said chamber and a source of relatively cool air therefor, comprising: a valve controlling the supply of air from one of said sources; a pressure responsive actuator controlling said valve, said actuator having a diaphragm subjected on one side to relatively low pressure; means defining a control pressure chamber at the other side of said diaphragm so that said side of said diaphragm is subjected to the pressure in said control pressure chamber, the diaphragm responding to variations in the differential of pressure on the opposite sides thereof; pressure regulating means including a pressure responsive diaphragm responsive to variations in the differential of pressure on opposite sides thereof; one side of said diaphragm being subjected to a relatively low pressure; means defining a regulator pressure chamber, the other side of said diaphragm being subjected to the pressure in said regulator pressure chamber; amplifier means, including a valve member and an amplifier diaphragm operably connected with said valve member and responsive to variations in the differential of pressure on opposite sides thereof; means defining a balancing chamber at one side of said amplifier diaphragm, said one side of said diaphragm being subjected to a relatively low pressure in said balancing chamber; means defining an amplifier pressure chamber on the opposite side of said amplifier diaphragm; means defining a passage connecting the regulator chamber and the amplifier pressure chamber, there being a pair of restricted orifices in said passage, said orifices being spaced apart; a conduit connecting one of the sources of air with said passage between said orifices; a regulator valve including a movable valve member operably connected with the regulator diaphragm, adapted to control said conduit; means defining a connection between the regulator chamber and the amplifier balancing chamber; an outflow passage between the amplifier chamber and ambient atmosphere; a valve controlling said outflow passage; and temperature responsive means subjected to the temperature in said mixing chamber and controlling the last mentioned valve.

4. Temperature control apparatus for controlling the temperature of air in an enclosure supplied with relatively hot air and relatively cool air from respective sources, comprising: a valve controlling the supply of air to said enclosure from one source; a pressure responsive actuator controlling said valve, said actuator having a diaphragm subjected on one side to a region of relatively low pressure; means defining a control pressure chamber at the other side of said diaphragm so that said side of said diaphragm is subjected to said control chamber pressure, the diaphragm responding to variations in the differential of pressure on the opposite sides thereof; pressure regulating means including a pressure responsive diaphragm responsive to variations in the differential of pressure on opposite sides thereof, one side of said diaphragm being subjected to relatively low pressure; means defining a regulator pressure chamber, the other side of said diaphragm being subjected to the pressure in said regulator pressure chamber; a conduit connecting the regulator pressure chamber with a source of operating pressure; a movable valve member operably connected with the regulator diaphragm and adapted to control said conduit; a duct connecting said conduit with the actuator pressure chamber; a valve, including a movable valve member, for controlling said duct; an amplifier diaphragm operably connected with the last mentioned valve member and responsive to variations in the differential of pressure on opposite sides thereof, one side of said amplifier diaphragm being subjected to relatively low pressure; means defining an amplifier pressure chamber, the opposite side of said amplifier diaphragm being subjected to pressure in said amplifier pressure chamber; means defining a passage connecting the regulator chamber and the amplifier chamber, said passage including a portion of said conduit; means defining a restricted orifice in said passage between the source of operating pressure and the amplifier chamber, said orifice also being between the regulator chamber and the amplifier chamber; an outflow passage between the amplifier chamber and a relatively low pressure region; a valve controlling said outflow passage; and temperature responsive means subjected to the temperature in said enclosure and controlling the last mentioned valve.

5. Temperature control apparatus for controlling the temperature of air in an enclosure wherein said enclosure has a supply of relatively hot air and a supply of relatively cool air, comprising: a valve controlling air supply to said enclosure; a pressure responsive actuator controlling said valve, said actuator including an actuator diaphragm; means defining a control pressure chamber at one side of said diaphragm so that said side of said diaphragm is subjected to said control chamber pressure, the other side of said diaphragm being subjected to a lower pressure and said diaphragm responding to variations in the differential of pressure on the opposite sides thereof; pressure regulating means including a pressure regulator diaphragm responsive to variations in the differential of pressure on opposite sides thereof, one side of said diaphragm being subjected to a relatively low pressure; means defining a regulator pressure chamber, the other side of said regulator diaphragm being subjected to the pressure in said regulator pressure chamber; a conduit, including a restricated orifice therein, connecting the regulator pressure chamber with a source of operating pressure; a movable valve member operably connected with the regulator diaphragm and adapted to control said conduit; a duct connecting said conduit with the actuator pressure chamber; a valve, including a movable valve member, for controlling said duct; an amplifier diaphragm operably connected with the last mentioned valve member and responsive to variations in the differential of pressure on opposite sides thereof, one side of said amplifier diaphragm being subjected to relatively low pressure; means defining an amplifier pressure chamber, the opposite side of said amplifier diaphragm being subjected to pressure in said amplifier pressure chamber; means defining a passage connecting the regulator chamber and the amplifier chamber and having a restricted orifice therein; an outflow passage between the amplifier chamber and a low pressure region; a valve controlling said outflow passage; temperature responsive means subjected to the temperature in said enclosure and controlling the last mentioned valve; and means defining a pressure relief passage between said conduit and a low pressure region upstream of said restricted orifice, said pressure relief passage being controlled by the regulator valve member.

6. Temperature control apparatus for controlling the mixing of air in an enclosure wherein said enclosure has a supply of relatively hot air and a supply of relatively cool air from respective sources, comprising: a valve controlling one of the air supplies to said enclosure; a pressure responsive actuator controlling said valve, said actuator having a movable wall subjected on one side to a region of relatively low pressure; meaans defining a control pressure chamber at the other side of said wall so that said side of said wall is subjected to said control chamber pressure; pressure regulating means including a pressure responsive element responsive to variations in the differential of pressure on opposite sides thereof, one side of said element being subjected to said region of relatively low pressure; means defining a regulator pressure chamber, the other side of said element being subjected to the pressure in said regulator pressure chamber; a conduit connecting the regulator pressure chamber with an operating pressure supply; a movable valve member operably connected with the regulator element and adapted to control said conduit; a duct connecting said conduit with the actuator pressure chamber; a valve, including a movable valve member, for controlling said duct; an amplifier element operably connected with the last mentioned valve member and responsive to variations in the differential of pressure on opposite sides thereof; an amplifier pressure chamber, one side of said amplifier element being subjected to pressure in said amplifier pressure chamber; means defining a passage connecting the regulator chamber and the amplifier chamber; and means for modifying the pressure in the amplifier chamber including temperature responsive means subjected to the temperature in said enclosure.

References Cited in the file of this patent

UNITED STATES PATENTS

| | | |
|---|---|---|
| 306,314 | Beechey | Oct. 7, 1884 |
| 508,133 | Gold | Nov. 7, 1893 |
| 875,957 | Saugstad | Jan. 7, 1908 |
| 1,737,428 | Mercur | Nov. 26, 1929 |
| 1,763,666 | Machlet | June 17, 1930 |
| 1,853,194 | Bogle | Apr. 12, 1932 |
| 1,868,555 | Wiley | July 26, 1932 |
| 2,061,915 | Mautsch | Nov. 24, 1936 |
| 2,210,646 | Wheeler | Aug. 6, 1940 |
| 2,371,428 | DeGiers | Mar. 13, 1945 |
| 2,519,475 | Kennedy | Aug. 22, 1950 |

FOREIGN PATENTS

| | | |
|---|---|---|
| 513,162 | Germany | Nov. 22, 1930 |